Jan. 5, 1932.   E. HILWIG   1,839,557

BEARING GRINDER

Filed March 31, 1928

Inventor
Edward Hilwig

By Mason Fenwick & Lawrence
Attorneys

Patented Jan. 5, 1932

1,839,557

UNITED STATES PATENT OFFICE

EDWARD HILWIG, OF CLARKS GREEN, PENNSYLVANIA

BEARING GRINDER

Application filed March 31, 1928. Serial No. 266,380.

This invention relates to improvements in grinding devices for bearings and the like.

An object of this invention is to provide a bearing grinder which may be readily adapted for use in the grinding of bearings for automobiles and the like.

A further object of this invention is to provide a bearing grinder which may be adjusted to various sizes of bearings.

Other objects of this invention will appear from the following detailed description of the device and as disclosed in the single sheet of drawings which is herewith made a part of this application.

In the drawings—

Figure 1:
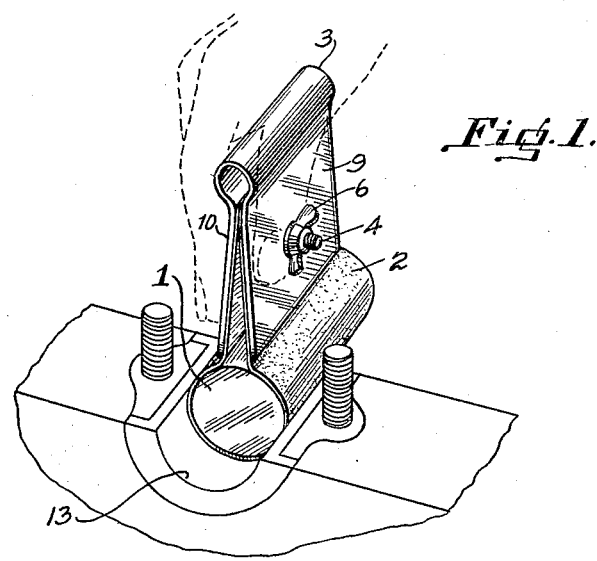
Fig. 1 illustrates a perspective view of the bearing grinder in operative relationship to the bearing.
Figures 2, 3, 4:
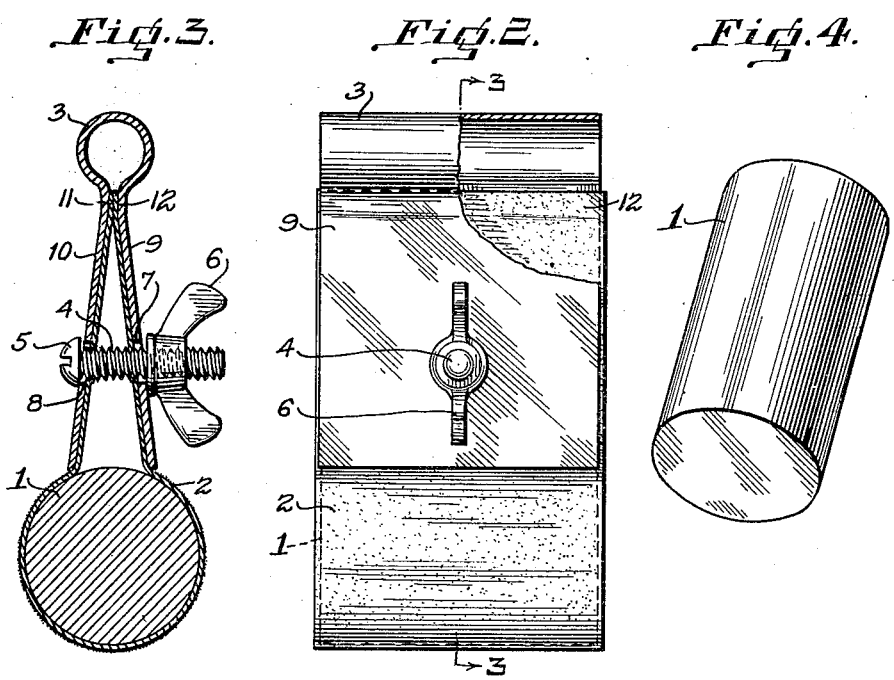
Fig. 2 represents a side elevational view of the bearing grinder with a portion broken away.
Fig. 3 illustrates an end view of Fig. 2.
Fig. 4 illustrates a perspective view of the grinding roll for receiving the sand paper or emery cloth.

The bearing grinder according to this invention is preferred to be constructed having a roll member 1, made of any suitable material such as steel, and a sheet of flexible abrasive such as sand paper or emery cloth 2 being adapted to be brought under tension around the roll by means of a suitably formed clamping member, made of sheet spring steel or the like bent upon itself centrally into a substantially cylindrical part 3 and then into outwardly diverging wing parts 9 and 10. A tension bolt 4 having a head end 5, and a wing nut 6, is provided, the shank portion of the tension bolt 4 extending through suitable openings 7 and 8 in the divergent wing sections 9 and 10 of the clamping member, and in the upwardly extending portions 11 and 12 of the sand paper or emery cloth 2, in such a manner that when the wing nut 6 is brought under tension against the downwardly extending wing portions 9 and 10 of the clamping member, the sand paper or emery cloth 2 will be brought under tension firmly around a large proportion of the circumference of the roll 1.

The bearing grinder above described and claimed herewith may be used in any adaptable manner, particularly for grinding the bearings of automobiles, as clearly noted in Fig. 1, wherein the grinding roll 1 and 2, is disclosed in operative relationship with a Babbitt bearing 13.

Usually, Babbitt bearings are supplied somewhat smaller than the spindle or shaft members which are intended to be supported therein, and are provided that way so that they may be ground to fit the shafts. The ordinary bearing grinder at present in common use is inefficient and tends to scrape out the bearings and injure the linings or the surfaces thereof. Furthermore, new bearings are not true to form, as a rule, and this invention provides a bearing grinder which may be easily adjusted to the requirements of various diameters of bearings.

The roll 1 may be easily replaced by a roll or supporting member for the sand paper or emery cloth 2, of any desirable diameter for fitting the bearing, as shown in Fig. 1. The shank or clamping portion 3 of the grinder is readily grasped by a hand or other source of power and the grinding surface 2 is readily moved back and forth until the bearing is large enough for receiving the shaft. In this manner the bearing when completed will be perfectly true, and the work of grinding is accomplished more easily and speedily than by the ordinary methods.

It is to be understood that substitutions and alterations may be made in the specifications and the drawings within the scope of the appended claims, without affecting the merits of this invention.

What I claim is:

1. A bearing grinder comprising a flexible sheet of abrasive, a form member and a clamping member consisting of a sheet of resilient metal bent upon itself centrally into substantially cylindrical form and then into two outwardly diverging wing parts, and means for drawing said wing parts together whereby the parts of said wings adjacent the cylindrical part of the clamp will grip the edges of the sheet positioned therebetween and the edges of said wings will exert tension on parts of said sheet substantially as specified.

2. A bearing grinder comprising a form, a sheet of flexible abrasive positioned around the form with its ends extending side by side away from the form, means for gripping the edges of the sheet remote from the form, means for applying inward pressure to the parts of the sheet intermediate the gripped edges thereof and the form to draw them together, tightening them around the form and tensioning the sheet.

3. A bearing grinder comprising a form, a sheet of flexible abrasive positioned around the form with its ends extending side by side away from the form, members gripping the outwardly extending parts of the sheet remote from the form and in contact with the said parts between the form and the gripped portions, means for drawing said members together to grip the remote edges of the sheet and apply tension to the sheet on the form.

4. A bearing grinder comprising a form, a sheet of abrasive material wrapped partially around said form and having end portions extending in substantially the same direction away from said form, a pair of members embracing said end portions and hingedly connected together at their outer ends, means spaced from the form for securing the end portions of the sheet between said members to keep said end portions from slipping endwise, and for drawing the inner ends of the members together to place the sheet under tension.

In testimony whereof I affix my signature.
EDWARD HILWIG.